(12) United States Patent
Yamaguchi (10) Patent No.: US 11,651,603 B2
(45) Date of Patent: May 16, 2023

(54) IMAGING DATA ANALYZER

(71) Applicant: SHIMADZU CORPORATION, Kyoto (JP)

(72) Inventor: Shinichi Yamaguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 157 days.

(21) Appl. No.: 17/291,013

(22) PCT Filed: Nov. 20, 2018

(86) PCT No.: PCT/JP2018/042761
§ 371 (c)(1),
(2) Date: May 4, 2021

(87) PCT Pub. No.: WO2020/105102
PCT Pub. Date: May 28, 2020

(65) Prior Publication Data
US 2022/0044003 A1    Feb. 10, 2022

(51) Int. Cl.
*G06V 10/25* (2022.01)
*G06V 20/69* (2022.01)
(Continued)

(52) U.S. Cl.
CPC .......... *G06V 20/693* (2022.01); *G06V 10/235* (2022.01); *G06V 10/25* (2022.01); *G06V 10/507* (2022.01); *H01J 49/26* (2013.01)

(58) Field of Classification Search
CPC .... G06V 20/693; G06V 10/25; G06V 10/235; G06V 10/507; H01J 49/26
See application file for complete search history.

(56) References Cited

U.S. PATENT DOCUMENTS

2011/0315874 A1* 12/2011 Ikegami ............... H01J 49/0413
250/288
2012/0278037 A1* 11/2012 Matsuura ................. G01N 1/28
702/173
(Continued)

FOREIGN PATENT DOCUMENTS

WO    2018/037491 A1    3/2018
WO    2018/131274 A1    7/2018

OTHER PUBLICATIONS

International Search Report for PCT/JP2018/042761 dated Feb. 19, 2019 PCT/ISA/210.
(Continued)

*Primary Examiner* — Syed Haider
(74) *Attorney, Agent, or Firm* — Sughrue Mion, PLLC (57) ABSTRACT

When a user designates a region of interest for a plurality of groups targeted for difference analysis in a microscopic observation image of a sample, an m/z candidate search unit searches for candidates for m/z presumed to differ, based on collected mass spectral data. An intensity histogram creation unit processing unit creates and displays a graph showing a frequency distribution of peak intensities at measurement points included in the ROI of the groups for each of the m/z candidates. If this graph exhibits multimodality, the data distribution is not suitable for a statistical hypothesis test. An intensity range determination unit limits an intensity range in accordance with a user's instruction. Then, ROI correction unit corrects the ROI so as to include only measurement points with peak intensities within the limited intensity range. A test processing unit performs a statistical hypothesis test using the data corresponding to the corrected ROI.

10 Claims, 6 Drawing Sheets

(51) Int. Cl.
    *G06V 10/22*     (2022.01)
    *G06V 10/50*     (2022.01)
    *H01J 49/26*     (2006.01)

(56) References Cited

U.S. PATENT DOCUMENTS

| | | | |
|---|---|---|---|
| 2014/0355862 A1* | 12/2014 | So | G06V 20/69 |
| | | | 382/133 |
| 2014/0356876 A1* | 12/2014 | Ragan | C12Q 1/686 |
| | | | 435/7.1 |
| 2016/0181075 A1* | 6/2016 | Bajic | H01J 49/04 |
| | | | 250/288 |
| 2017/0301526 A1* | 10/2017 | Sanford | H01J 49/0031 |
| 2017/0368205 A1* | 12/2017 | Zarrine-Afsar | G01N 33/58 |
| 2019/0272984 A1 | 9/2019 | Takeshita | |
| 2019/0369128 A1 | 12/2019 | Yamada et al. | |

OTHER PUBLICATIONS

Written Opinion for PCT/JP2018/042761 dated Feb. 19, 2019 PCT/ISA/237.

\* cited by examiner

IMAGING DATA ANALYZER

CROSS REFERENCE TO RELATED APPLICATIONS

This application is a National Stage of International Application No. PCT/JP2018/042761 filed Nov. 20, 2018.

TECHNICAL FIELD

The present invention relates to an imaging data analyzer that analyzes and processes data obtained through an analysis technique, such as a mass spectrometry imaging method, an infrared imaging method, or a Raman imaging method, by which a spectrum associated with a mass-to-charge ratio, a wavelength, or other parameters can be acquired for each of many micro areas within a two-dimensional region on a sample or within a three-dimensional region in the sample.

BACKGROUND ART

An imaging mass spectrometer is an apparatus with which a user can measure a two-dimensional intensity distribution of ions having a specific mass-to-charge ratio m/z on the surface of a sample, such as a biological tissue's section, while observing the geometry of the sample surface through an optical microscope (see Patent Literature 1, etc.). The user can use this imaging mass spectrometer to observe a mass spectrometric image of ions derived from a compound characteristically appearing in a specific disease, such as a cancer, thereby recognizing the spread of this disease, for example. For this reason, studies with imaging mass spectrometers have been recently actively conducted, for example, to pharmacokinetically analyze biological tissue sections and differences in compound distribution between individual organs and between normal sites and pathological sites such as cancers.

To perform analysis as described above, at first, a user (a person charged with an analysis) typically sets one or more regions of interest (ROI) on samples included in a plurality of groups to be compared in an optical microscopic image or a mass spectrometric image. Then, the user uses mass spectral data of a micro area included in the ROI to perform difference analysis and comparative analysis between the plurality of groups (e.g., see Patent Document 2). For example, suppose a case where the user analyzes the difference between a first group, such as a pathological site, and a second group, such as a normal site, and finds a mass-to-charge ratio presumed to have a significant difference. In this case, the user can use the compound corresponding to this mass-to-charge ratio as a marker to distinguish between the first group and the second group, namely, identify whether the patient develops a disease. Furthermore, attempts that eliminate the need for a user to set an ROI in the above manner have been made. Those attempts are to automatically identify the area of cells from an optical microscopic image or a phase difference micro image including the cells, for example, and set an ROI to the identified area.

For the above comparative analysis or difference analysis, a statistical hypothesis test, such as a t-test, an F-test, or an ANOVA (analysis of variance), is sometimes used. Further, the t-test and F-test are used for the difference analysis and the comparative analysis between two groups, whereas the ANOVA is used for the difference analysis and the comparative analysis between three or more groups.

CITATION LIST

Patent Literature

Patent Literature 1: WO 2018/037491 A
Patent Literature 2: WO 2018/131274 A

SUMMARY OF INVENTION

Technical Problem

General statistical hypothesis tests, as described above, typically assume that the frequency distribution of data to be analyzed is a monomodality distribution, such as a normal distribution. However, it is difficult to set an ROI completely free from micro areas that a user does not want or intend, regardless of whether the ROI is set by the user or determined automatically. Moreover, when a user manually sets an ROI, he/she may require high skill and experience to set the range of the ROI completely free from micro areas that he/she does not want or intend. For that reason, the frequency distribution of data in a micro area included in an ROI is not always in a proper state of employing a statistical hypothesis test; therefore, it may be difficult to assure the reliability of such tests. Moreover, even if a test is performed with high reliability, the operator may have difficulty verifying whether data had a proper frequency distribution.

An object of the present invention, which has been made to solve the above problems, is to provide an imaging data analyzer that, when performing difference analysis or comparative analysis, such as a statistical hypothesis test, after one or more ROIs corresponding to a plurality of groups have been set in an optical microscopic image, for example, can avoid a decrease in analysis accuracy due to improper setting of the ROIs.

Solution to Problem

A first aspect of the present invention, which is made to solve the above problems, is an imaging data analyzer that can create an image showing a two-dimensional distribution or a three-dimensional distribution of a signal intensity at a predetermined parameter value or in a predetermined parameter value range, based on spectral data obtained through a predetermined analysis subjected to a plurality of micro areas defined in a two-dimensional measurement area on a sample or in a three-dimensional measurement area in the sample, the spectral data showing a relationship between a predetermined parameter and a signal intensity. The imaging data analyzer includes a region-of-interest setting unit, a region-of-interest corresponding data selecting unit, an intensity range determination unit, and a region-of-interest determination unit. The region-of-interest setting unit is configured to set one or more local regions of interest within the two-dimensional or three-dimensional measurement area. The region-of-interest corresponding data selecting unit is configured to obtain signal intensities at the predetermined parameter value or in the predetermined parameter value range, from spectral data obtained in a plurality of micro areas included in the regions of interest set by the region-of-interest setting unit, the signal intensities corresponding to the plurality of micro areas in the regions of interest. The intensity range determination unit is configured to determine a range of a signal intensity to be analyzed, based on frequency distributions of the plurality of signal intensities obtained by the region-of-interest corresponding data selecting unit. The region-of-interest determination unit is configured to determine a substantial region of interest in each of the regions of interest set by the region-of-interest setting unit by collecting micro areas whose signal intensity is within the signal intensity range determined by the intensity range determination unit.

A second aspect of the present invention, which is made to solve the above problems, is an imaging data analyzer that can create an image showing a two-dimensional distribution or a three-dimensional distribution of a signal intensity at a predetermined parameter value or in a predetermined parameter value range, based on spectral data obtained through a predetermined analysis subjected to a plurality of micro areas defined in a two-dimensional measurement area on a sample or in a three-dimensional measurement area in the sample, the spectral data showing a relationship between a predetermined parameter and a signal intensity, the imaging data analyzer includes a region-of-interest setting unit, a region-of-interest corresponding data selecting unit, an intensity range determination unit, and an analysis execution unit. The region-of-interest setting unit is configured to set one or more local regions of interest within the two-dimensional or three-dimensional measurement area. The region-of-interest corresponding data selecting unit is configured to obtain signal intensities at the predetermined parameter value or in the predetermined parameter value range, from spectral data obtained in a plurality of micro areas included in the regions of interest set by the region-of-interest setting unit, the signal intensities corresponding to the plurality of micro areas in the regions of interest. The intensity range determination unit is configured to determine a range of a signal intensity to be analyzed, based on frequency distributions of the plurality of signal intensities obtained by the region-of-interest corresponding data selecting unit. The analysis execution unit is configured to perform a predetermined analysis by using a signal intensity acquired from the plurality of signal intensities obtained by the region-of-interest corresponding data selecting unit, the acquired signal intensity being within the signal intensity range determined by the intensity range determination unit.

In the present invention, the "predetermined analysis" is typically mass spectrometry, in which case the "predetermined parameter" is a mass-to-charge ratio. In addition, the spectral data is mass spectral data.

The "predetermined analysis" may be infrared spectroscopic measurement (including Fourier transform infrared spectroscopic measurement) or Raman spectroscopic measurement, in which case the "predetermined parameter" is a wavelength or a reciprocal of the wavelength.

The "predetermined analysis" may be X-ray spectroscopic measurement, in which case the "predetermined parameter" is a wavelength or energy of X-rays.

The "spectral data" "obtained by a predetermined analysis subjected to a plurality of micro areas set in the three-dimensional measurement region in the sample" in the present invention is, for example, three-dimensional data created by collecting spectral data obtained by subjecting two-dimensional analysis to many sample sections prepared by very thinly and continuously slicing a sample having a three-dimensional size.

In the present invention, the region-of-interest setting unit sets one or more local regions of interest within a two-dimensional measurement area on a sample or a three-dimensional measurement area in the sample. The region of interest discussed herein is typically an area that a user notes as an analysis target. For example, when a purpose of analysis is to analyze a difference between a pathological site and a normal site in a living tissue, for example, the regions of interest are ranges presumed to be the pathological site and the normal site.

When a purpose of analysis is to investigate a compound present in specific cells, the regions of interest are the inside of the cells and the part other than the cells. A process in which the region-of-interest setting unit sets regions of interest may be either a setting process performed in response to user's designation of the region of interest or an automatic setting process that does not involve the user.

In the former case (where the user is involved in the setting), the region-of-interest setting unit includes: an image display processing unit configured to display, in a display unit, an observation image or an image of the two-dimensional or three-dimensional measurement area; and a region-of-interest range designation unit configured to allow a user to designate a range of a region of interest in the observation image or the image displayed in the display unit. The region-of-interest setting unit can set the region of interest to the range designated through the region-of-interest range designation unit.

The observation image refers to an image in which shapes and aspects of various sites on the sample can be observed. When the predetermined analysis is mass spectrometry, the observation image is an optical microscopic image, a phase difference microscopic image, for example, and the image is a mass spectrometric image.

In the above configuration, for example, the image display processing unit displays, in the display unit, an optical microscopic image of the two-dimensional measurement area on the sample. The user identifies a region of interest to be analyzed by using the displayed optical microscopic image and then designates a range of the region of interest in the image with the region-of-interest range designation unit. More specifically, for example, the user may designate the range of the region of interest as by performing a process of surrounding a range of a desired region of interest with a frame having a fixed shape or with any deformable frame. When the user designates the range of the region of interest in the three-dimensional optical microscopic image (3D image), the image display processing unit let the user to rotate the image in three dimensions so that the user can designate a desired three-dimensional range of the region of interest. The region-of-interest range designation unit sets the region of interest to the range the user has designated in this manner.

In the present invention, the region-of-interest corresponding data selecting unit identifies a plurality of micro areas included in the region of interest set by the region-of-interest setting unit and then obtains peak intensities at a specific mass-to-charge ratio value from spectral data, such as a mass spectral data, obtained in the plurality of micro areas. The intensity range determination unit determines a range of a peak intensity to be analyzed by using the frequency distributions of the plurality of peak intensities obtained at the specific mass-to-charge ratio value.

More specifically, for example, in the present invention, the above intensity range determination unit may include a frequency distribution display processing unit and an intensity range designation unit. The frequency distribution display processing unit is configured to display, in the display unit, a graph showing frequency distributions of the plurality of signal intensities obtained by the region-of-interest corresponding data selecting unit. The intensity range designation unit is configured to allow a user to designate the intensity range in a frequency distribution graph displayed in the display unit. The intensity range determination unit may determine that a range of a signal intensity to be analyzed is the intensity range designated through the intensity range designation unit.

The user views the displayed frequency distribution graph showing the signal intensity and, if a plurality of peaks appear in the frequency distribution, he/she designates the start and end points of the range of one of the peaks with the intensity range designation unit. The intensity range determination unit determines that a range of a signal intensity to be analyzed is the intensity range designated in this manner. In this way, it is possible to extract only a micro area in which a signal intensity whose frequency distribution is guaranteed to exhibit monomodality is obtained, from many micro areas included in the set region of interest.

In the apparatus according to the first aspect of the present invention, after the range of the signal intensity has been determined in the above manner, the region-of-interest determination unit determines a substantial region of interest by collecting only micro areas whose signal intensities are within the signal intensity range. In other words, the apparatus automatically excludes micro areas in which the signal intensities obtained by the analysis fall outside the above signal intensity range, from the region of interest set based on the user's designation, thereby correcting the region of interest so as to obtain a significant analysis result (in many cases, reducing the region of interest).

In the apparatus according to the second aspect of the present invention, after the range of the signal intensity has been determined in the above manner, the analysis execution unit uses only signal intensities within the signal intensity range to perform a predetermined analysis process. In other words, in the apparatus according to the second aspect, the analysis execution unit performs an analysis process on only signal intensities obtained from micro areas included in the substantial region of interest (corrected region of interest) determined by the region-of-interest determination unit. As a result, even if a region of interest set based on user's designation, for example, includes a micro area that is not intended for the purpose of the analysis, the analysis execution unit can perform an appropriate analysis process by excluding analyses result obtained from such micro areas.

In the above second aspect of the present invention, the region-of-interest setting unit preferably sets the one or more regions of interest included in a plurality of groups targeted for difference analysis or comparative analysis. The analysis execution unit can subject difference analysis or comparative analysis to the plurality of groups, based on a signal intensity obtained as a result of a process that the region-of-interest corresponding data selecting unit and the intensity range determination unit perform on the plurality of groups.

Herein, the above difference analysis or comparative analysis may be an analysis using a statistical hypothesis test, such as a t-test, an F-test, or an ANOVA.

If the intensity range determination unit appropriately determines a range of a signal intensity in the above manner, the frequency distribution of data to be analyzed can be a monomodality distribution. Therefore, it is possible to improve the reliability of the statistical hypothesis test and, for example, accurately obtain a parameter value (e.g., mass-to-charge ratio value) having a significant difference between a plurality of groups.

In the present invention, when any signal intensity or signal intensity range is designated in a frequency distribution graph displayed in the display unit, the image display processing unit may display a micro area corresponding to the signal intensity or the signal intensity range in the observation image or the image of the two-dimensional or three-dimensional measurement areas displayed in the display unit.

With the above configuration, for example, the user can visually and easily check a location of a micro area in an observation image or an image to which a signal intensity that deviates from a predetermined peak in the frequency distribution graph corresponds.

In the present invention, when any site or range in the regions of interest is designated in the observation image or the image of the two-dimensional or three-dimensional measurement areas displayed in the display unit, the frequency distribution display processing unit may display a location of a signal intensity in the frequency distribution graph, the signal intensity being obtained in a micro area corresponding to the site or range.

With the above configuration, for example, the user can visually and easily check a location at which the signal intensity obtained in an observation image or an image at a notable location is present in the frequency distribution of the signal intensity corresponding to the region of interest.

It is obviously possible to employ the combination of the configurations of the first and second aspects according to the present invention.

Advantageous Effects of Invention

According to the present invention, when performing a difference analysis or comparative analysis, such as a statistical hypothesis test, after one or more regions of interest corresponding to a plurality of groups have been set in an optical microscopic image or an image, for example, it is possible to avoid a decrease in analysis accuracy due to improper setting of the regions of interest, thereby providing a highly reliable analysis result. According to the present invention, even when a user somewhat roughly designates a region of interest, it is possible to provide a highly reliable analysis result only from a significant analysis result by excluding non-significant analysis results included in the designated region of interest. This enables a user to know a more appropriate range of interest in which such reliable analysis results can be obtained.

DESCRIPTION OF EMBODIMENTS

A description will be given below of an embodiment of an imaging mass spectrometric system that includes an imaging data analyzer according to the present invention, with reference to the accompanying drawings.

Figure 1:
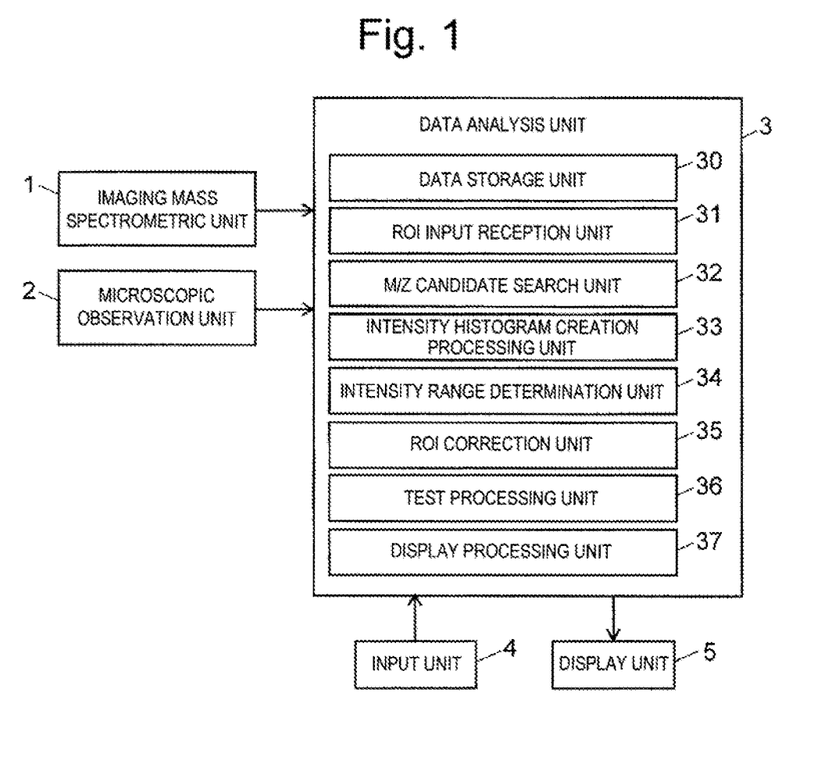
FIG. 1 is a schematic block configuration diagram of an embodiment of an imaging mass spectrometric system that includes an imaging data analyzer according to the present invention.

FIG. 1 is a schematic block configuration diagram of the imaging mass spectrometric system in this embodiment.

The imaging mass spectrometric system in this embodiment includes an imaging mass spectrometric unit 1, a microscopic observation unit 2, a data analysis unit 3, an input unit 4, and a display unit 5.

As disclosed in Patent Literature 1, for example, the imaging mass spectrometric unit 1 is a mass spectrometer that employs the combination of an ion trap time-of-flight mass spectrometer (IT-TOFMS) and an atmospheric pressure matrix-assisted laser desorption ionization (AP-MALDI) method in which a sample is irradiated with laser light in an atmospheric pressure atmosphere so that a substance in the sample is ionized. Also, the imaging mass spectrometric unit 1 is an apparatus that can scan a two-dimensional area of a sample at a location where the sample is irradiated with a laser beam for ionization, thereby performing mass spectrometry (including MS$^n$ analysis: n is 2 or more) at many measurement points (substantially a micro area) within the two-dimensional region. Obviously, a configuration of the imaging mass spectrometric unit 1 is not limited to that described above. In short, the imaging mass spectrometric unit 1 may be any apparatus that can acquire so-called mass spectrometric imaging data.

The microscopic observation unit 2 is typically a general optical microscope that can capture an optical microscopic image of a sample targeted for imaging mass spectrometry. Depending on the type of a sample, the microscopic observation unit 2 may be a special type of microscope, such as a phase contrast microscope or a differential interference microscope.

The data analysis unit 3 receives both mass spectrometric data at measurement points (micro area) obtained by the imaging mass spectrometric unit 1 and microscopic image data obtained by the microscopic observation unit 2 and then performs an analysis process based on the received data. To perform characteristic analysis processing that will be described later, the data analysis unit 3 includes as functional blocks, a data storage unit 30, an ROI input reception unit 31, an m/z candidate search unit 32, an intensity histogram creation processing unit 33, an intensity range determination unit 34, an ROI correction unit 35, a test processing unit 36, and a display processing unit 37.

An entity of the data analysis unit 3 may be a computer, such as a personal computer or a higher-spec workstation. The above functional blocks may be realized by executing dedicated data analysis software installed in the computer. In which case, the input unit 4 may be a keyboard or a pointing device (e.g., a mouse) provided for the computer; the display unit 5 may be a display monitor.

In the imaging mass spectrometric system of this embodiment, the imaging mass spectrometric unit 1 supplies the data analysis unit 3 with mass spectral data in a predetermined mass-to-charge ratio range on a sample, such as a biological tissue section, at many measurement points set within a measurement region having a predetermined area. Simultaneously, the microscopic observation unit 2 supplies the data analysis unit 3 with microscopic image data of a two-dimensional area that includes at least the measurement region. The above data are stored in the data storage unit 30.

Figure 2:
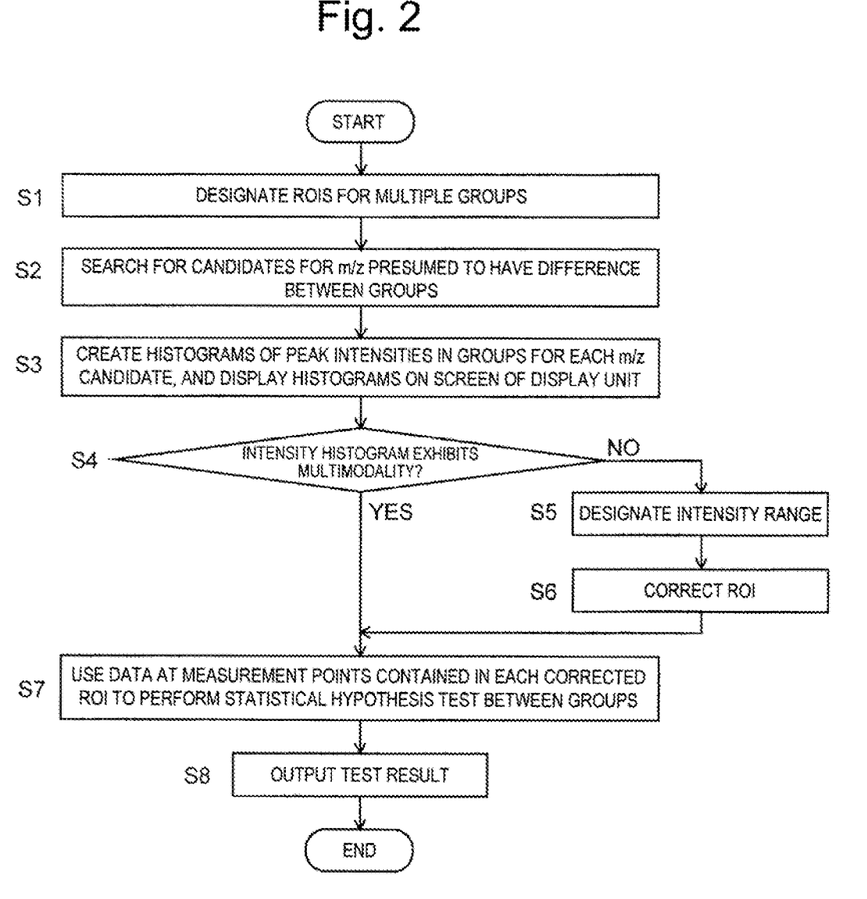
FIG. 2 is a flowchart of a procedure for a difference analysis in the imaging mass spectrometric system according to this embodiment.

In response to a predetermined user's operation with the input unit 4, the ROI input reception unit 31 reads the microscopic image data stored in the data storage unit 30 and then creates an optical microscopic image of the analyzed sample. The display processing unit 37 displays this optical microscopic image on the screen of the display unit 5. For example, the displayed optical microscopic image can be zoomed in or out or moved as appropriate. The user performs a predetermined operation with the input unit 4 while viewing the optical microscopic image, thereby designating ROIs corresponding to a plurality of groups to be subjected to a difference analysis (Step S1).

Figure 3A:
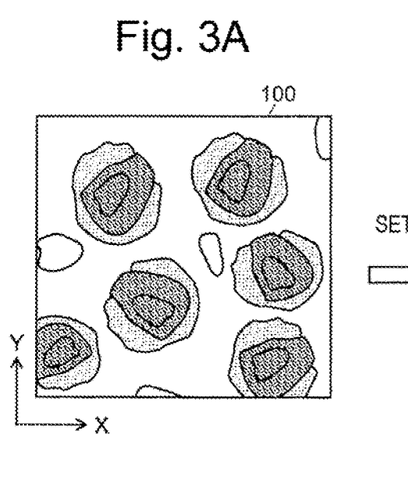
FIGS. 3A and 3B are diagrams of an example of setting an ROI in a microscopic image.
Figure 3B:
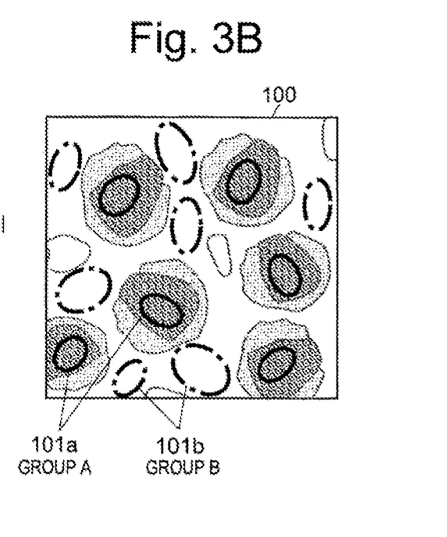

More specifically, for example, suppose a case where an optical microscopic image 100 as illustrated in FIG. 3A is displayed. An example of FIG. 3A is an observation image of a plurality of cells. The difference between the inside of cell nuclei and the outside of the cells is analyzed. In this case, the user designates a plurality of ROIs 101$a$ in a group A (intracellular group) within areas inside the cell nuclei and also designates a plurality of ROIs 101$b$ in a group B (extracellular group) within appropriate areas outside the cells. FIG. 3B is a view of a state in which the ROIs 101$a$ and 101$b$ are designated. The ROI input reception unit 31 sets ROIs 101$a$ and 101$b$ to the areas that the user has designated in this manner.

After having designated the ROIs in the described appropriate manner, the user performs a predetermined operation with the input unit 4 to instruct the data analysis unit 3 to start the difference analysis. In response to this instruction, the m/z candidate search unit 32 performs a process of searching for candidates for a mass-to-charge ratio m/z presumed to have a significant difference in peak intensity between groups A and B, based on mass spectral data at measurement points included in the ROIs 101$a$ and 101$b$ in the groups A and B set in Step S1 (hereinafter, the measurement points are referred to as "effective measurement points") (Step S2). More specifically, the m/z candidate search unit 32 performs the following process in this case.

First, the m/z candidate search unit 32 detects a peak of a mass spectrum at each effective measurement point in accordance with a predetermined reference and then creates a peak list by collecting a set of a mass-to-charge ratio value and a peak intensity value of each detected peak. Then, the m/z candidate search unit 32 uses a statistical hypothesis test, such as the t-test, to check whether or not there is a significant difference between peak intensity values in the groups A and B at an effective measurement point, for each mass-to-charge ratio listed in the peak list. Since the m/z candidate search unit 32 determines a p-value that indicates statistical reliability of the difference through this hypothesis test for each mass-to-charge ratio, it compares this p-value with a predetermined threshold to select a mass-to-charge ratio value that can differ between the groups.

However, as described later, the reliability of the hypothesis test at this time is limited, and thus the m/z candidate search unit 32 does not usually set a threshold to a significance level α (e.g., α=0.05 is generally used in the t-test) that is generally used to determine the p-value as the threshold and instead defines a more relaxed standard threshold. As result, the m/z candidate search unit 32 actually selects a considerable number of mass-to-charge ratio values that do not significantly differ between groups. The process of searching for the candidates for a mass-to-charge ratio presumed to have a significant difference in peak intensity between the groups A and B is not limited to the described one. Alternatively, another process, such as Bayesian estimation, may be used.

Figure 4:
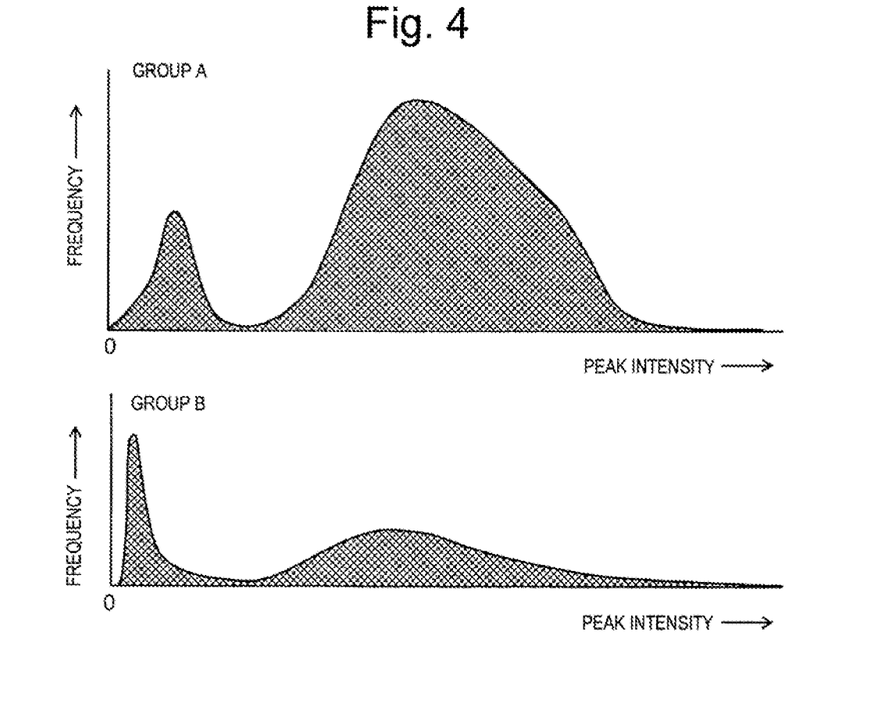
FIG. 4 is diagrams of an example of intensity histograms of two groups.

The m/z candidate search unit 32 usually picks up a relatively large number of mass-to-charge ratio values as the candidates, in Step S2. Then, the intensity histogram creation processing unit 33 creates histograms showing the frequency distributions of the peak intensities in the groups A and B at the effective measurement points for each mass-to-charge ratio value designated as the candidate. The display processing unit 37 displays the resultant intensity histograms on the screen of the display unit 5 (Step S3). FIG. 4 is an example of intensity histograms in the groups A and B for a certain mass-to-charge ratio value.

The result of such typical analyses indicates that the peak intensity corresponding to the compound existing in an area on a sample which is presumed to belong to one group usually exhibits a monomodality distribution, such as a normal distribution. As illustrated in FIG. 3B, however, when the user manually designates a range of an ROI, the ROI may include not only an area presumed to belong to one group but also adjacent areas belonging to other groups (not belonging to at least the above group). More specifically, it is not easy to set an ROI so as to include only areas belonging to a group intended by the user, especially when a sample is a biological sample. This is because the boundaries of areas belonging to different groups are often not clear in an image.

When a single ROI includes areas belonging to a plurality of groups, a frequency distribution of a peak intensity derived from a compound that characterizes one of the groups does not sometimes exhibit monomodality but multimodality. More specifically, as in the intensity histograms illustrated in FIG. 4, two or more peaks sometimes appear near a location on the intensity axis (horizontal axis) at which the intensity becomes zero and at the locations of about appropriate values apart from the location in the right direction (or the direction in which the intensity increases). In short, data indicating such frequency distributions is not a distribution of data premised on a statistical hypothesis test, such as the t-test. Thus, even if the statistical hypothesis test is performed on such data, the test is not sufficiently reliable. That is the reason why the threshold value used to determine the p-value is relaxed in the explanation of Step S2.

Figure 5:
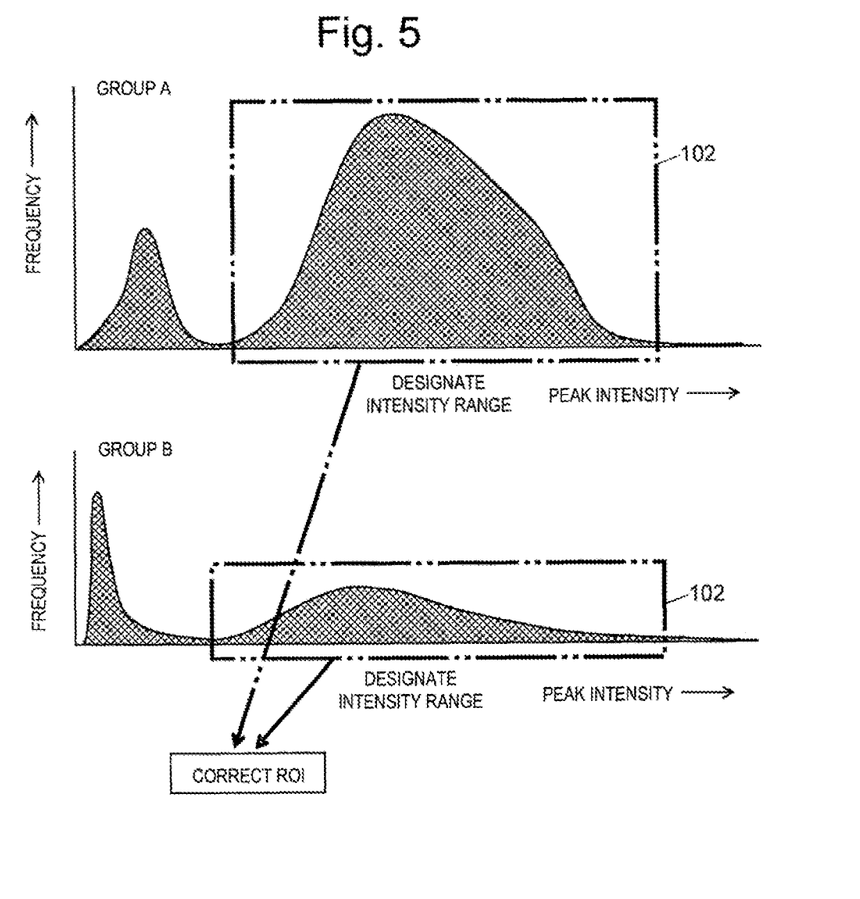
FIG. 5 is diagrams of an example of designating signal intensity areas in the intensity histograms illustrated in FIG. 4.

As described above, when a single ROI includes areas belonging to a plurality of groups, a frequency distribution of a peak intensity at a certain mass-to-charge ratio value exhibits multimodality. In this case, the range of the peak intensity in the frequency distribution which exhibits monomodality is believed to correspond to the region belonging to one group. Therefore, when intensity histograms, as illustrated in FIG. 4, are displayed on the screen of the display unit 5, the user visually checks these intensity histograms. When the intensity histograms exhibit monomodality (YES in Step S4), the user gives an instruction with the input unit 4. When the intensity histogram exhibits multimodality (NO in Step S4), the user designates intensity ranges of the intensity histogram which exhibit monomodality with the input unit 4, as illustrated in FIG. 5. In response to the user's designation, the intensity range determination unit 34 determines an intensity range to be selected (Step S5).

In the example of FIG. 5, the intensity range determination unit 34 designates the intensity ranges by surrounding desired intensity ranges with rectangular frames 102; however, the intensity range determination unit 34 may employ a method of designating the upper and lower limits of each intensity range with numerical values, instead of the above graphical specification method. The determination in Step S4 and the subsequent process in Step S5 are performed for both the intensity histograms of the A and B groups.

After the intensity range determination unit 34 has determined the intensity ranges, the ROI correction unit 35 substantially corrects each ROI in such a way that measurement points at which the peak intensities fall outside the determined intensity range are excluded from the measurement points included in the ROI 101a and 101b designated in Step S1 (Step S6). In many cases, a corrected ROI is smaller than that designated by the user. Alternatively, some designated ROIs are partly chipped. When the user selects YES in Step S4 and gives the instruction with the input unit 4, the processes of Steps S5 and S6 are skipped.

The test processing unit 36 uses the peak intensities at the measurement points included in each ROI in the corrected or uncorrected state to perform the t-test or another statistical hypothesis test for each mass-to-charge ratio value, thereby checking whether or not there is a significant difference between the groups A and B (Step S7). At the time of the statistical hypothesis test performed in Step S7, the frequency distributions of the peak intensities in the groups A and B should exhibit monomodality. Therefore, the statistical hypothesis test is highly reliable, so that the user can set a threshold used to determine the p-value to the significance level $\alpha$. The display processing unit 37 displays the mass-to-charge ratio value that has been determined to have a significant difference in the statistical hypothesis test with high reliability on the screen of the display unit 5 as the test result, thereby providing the mass-to-charge ratio value to the user (Step S8).

As described above, the imaging mass spectrometric system in this embodiment, even if an ROI is not set properly, utilizes the frequency distribution of the peak intensities at many measurement points included in the set ROI to appropriately correct the ROI and then limits data to be analyzed in accordance with the corrected ROI, thereby performing highly reliable difference analysis.

Figure 6A:
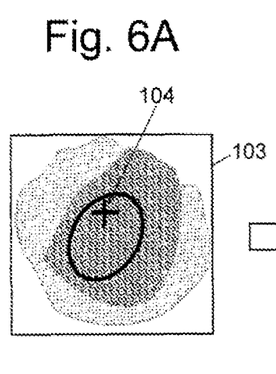
FIGS. 6A and 6B are explanatory diagrams of confirming, in an intensity histogram, a peak intensity corresponding to a designated location in a microscopic image.
Figure 6B:
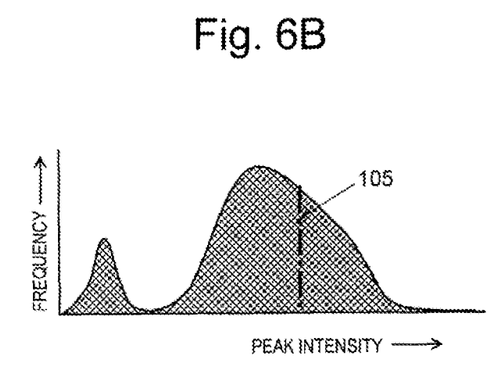
Figure 7A:
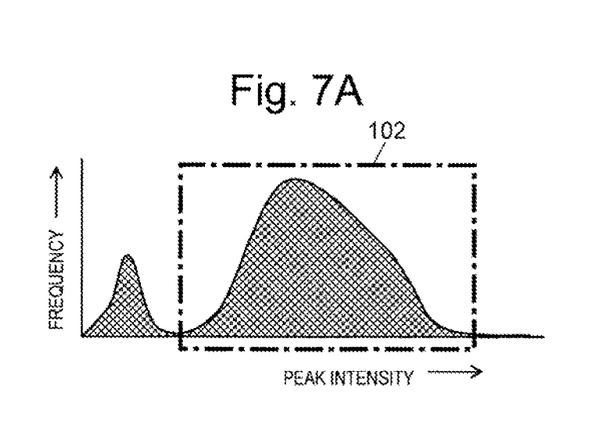
FIGS. 7A, 7B, and 7C are explanatory diagrams of confirming a location in a micro image which corresponds to a designated peak intensity in an intensity histogram.
Figure 7B:
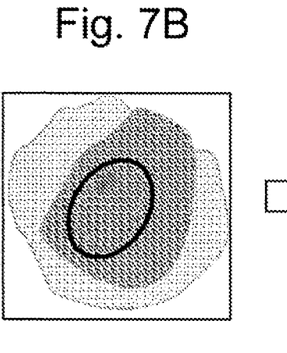
Figure 7C:
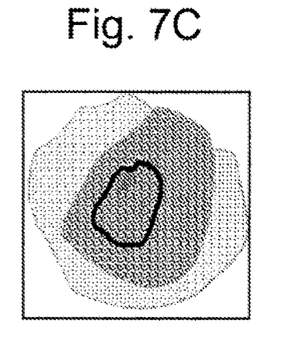

The imaging mass spectrometric system in this embodiment enables the user to grasp the correspondence between a location of a measurement point in an optical microscopic image displayed in the display unit 5 and a peak intensity in an intensity histogram, in the following manner. FIGS. 6A and 6B are explanatory diagrams of confirming a peak intensity in an intensity histogram which corresponds to a designated location in an optical microscopic image. FIGS. 7A, 7B, and 7C are explanatory diagrams of confirming a location in an optical microscopic image which corresponds to a designated peak intensity in an intensity histogram.

As illustrated in FIG. 6A, when an optical microscopic image 103 is displayed in the display unit 5, the user designates a location to be checked within an RIO with a cursor 104. The intensity histogram creation processing unit 33 acquires information on peak intensity of a predetermined mass-to-charge ratio corresponding to a measurement point at the designated location and then transmits the acquired information to the display processing unit 37. In response to the receipt of the information, the display processing unit 37 displays a marker 105, at the location of the indicated peak intensity, in an intensity histogram displayed in the display unit 5 at that time (see FIG. 6B). As a result, the user can visually know a location at which a peak intensity corresponding to a certain site in the optical microscopic image is positioned in the frequency distribution of the intensity histogram.

As illustrated in FIG. 7A, when the intensity histogram is displayed on the display unit 5, the user designates an intensity range by using a rectangular frame 102 and then performs a predetermined operation. The ROI correction unit 35 substantially corrects the ROI as described above and then transmits information indicating the corrected ROI to the display processing unit 37. In response to the receipt of this information, the display processing unit 37 alters the shape of the frame indicating the range of the ROI in the optical microscopic image displayed in the display unit 5 at that time (see FIGS. 7B and 7C). As a result, the user can visually know an actual state of the ROI corresponding to the designated intensity range in the intensity histogram.

The system in the above embodiment analyzes the difference between two groups; however, it is obvious for this system to be able to analyze the difference between three or more groups. In that case, a statistical hypothesis test may be the ANOVA, for example.

In the imaging mass spectrometric system in the above embodiment, the user performs the following processes by himself/herself: a process of setting ROIs in Step S1 in FIG. 2; a process of determining whether or not the intensity histogram exhibits monomodality in Step S4; and a process of setting an intensity range in an intensity histogram in Step S5. Alternatively, the configuration of the system may be modified so that it automatically performs one or more of the processes without involving user's operations.

More specifically, the imaging mass spectrometric system can set an ROI by using image recognition with machine learning, for example, if an object to which the ROI is to set has a fixed shape, pattern, or color.

The imaging mass spectrometric system can determine whether an intensity histogram exhibits monomodality by using a general peak detection algorithm, which is used to detect a peak in a chromatogram, for example. Furthermore, to set an intensity range in an intensity histogram, conditions for selecting a peak from a plurality of detected peaks may be determined in advance. Therefore, the imaging mass spectrometric system can detect the peak from the start point to the end point in accordance with the conditions by using the peak detection algorithm. Examples of the conditions for selecting a peak from a plurality of peaks include: selecting the peak with the highest intensity; selecting the peak with the largest peak area; and selecting the peak with the greatest peak width.

With the above modification to the system configuration, the imaging mass spectrometric system can automatically perform a series of processes in Steps S1 to S7 illustrated in FIG. 2 without involving user's operations. Obviously, the processes can be modified as appropriate: for example, the user can check a result in the course of the automatic processing. Then, if the automatic processing is not appropriate, the user can manually modify the processing.

The system in the above embodiment handles a two-dimensional optical microscopic image or a mass spectrometric image as an image targeted for difference analysis; however, the present invention is also applicable to difference analysis targeted for a three-dimensional image.

Figure 8A:
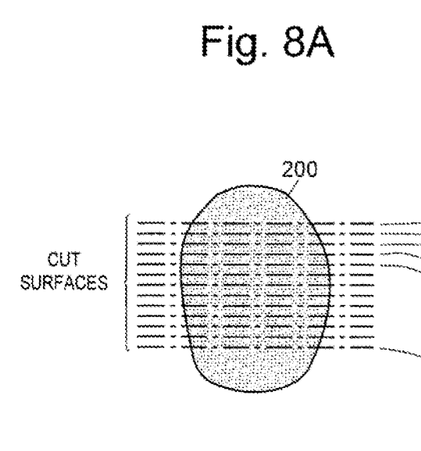
FIGS. 8A and 8B are conceptual diagrams of three-dimensional microscopic images and mass spectrometric images.
Figure 8B:
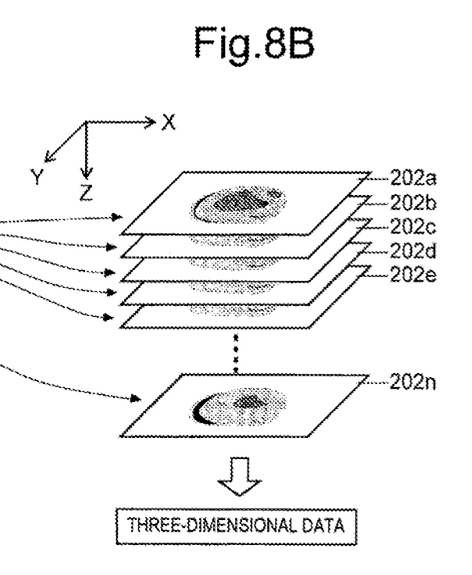

FIGS. 8A and 8B are conceptual diagrams of three-dimensional microscopic images and mass spectrometric images. As illustrated in FIG. 8A, for example, many sample flakes are prepared by continuously and thinly slicing a sample 200, such as a small piece of an organ cut out from a living body. In this case, the cut surfaces of the sample flakes are parallel to the X-Y plane. The imaging mass spectrometric unit 1 and the microscopic observation unit 2 measure the inside of a two-dimensional measurement area on each sample flake. As a result, as illustrated in FIG. 8B, optical microscopic images 202a to 202n and mass spectrometric images corresponding to the individual sample flakes can be obtained. By arranging the resultant images side by side in the Z-axis direction with their locations on the X- and Y-axes aligned, substantially three-dimensional microscopic image data and mass spectrometric imaging data can be obtained. Then, by drawing a 3D micro image or a 3D mass spectrometric image based on the data so that the user can set a three-dimensional ROI on these images, the process that is the same as that subjected to the above two-dimensional micro image or mass spectrometric image can be performed.

As described above, the imaging data analyzer according to the present invention is also applicable to a process for data extended in three dimensions.

The imaging mass spectrometric system in the foregoing embodiment is realized by applying the present invention to the analyzing of data obtained through imaging mass spectrometry; however, the present invention is also applicable to the analyzing of data obtained through other imaging analysis.

In an infrared (IR) imaging method and a Raman imaging method, for example, an absorption spectrum or a Raman spectroscopic spectrum in a predetermined wavelength range can obtained at each of many measurement points on a sample. Based on the resultant data, an image showing a two-dimensional distribution of intensity at a specific wavelength can be created. In the X-ray spectroscopic imaging method, a spectroscopic spectrum in a predetermined wavelength (energy) range can be obtained at each of many measurement points on a sample can be obtained. Based on the resulting data, an image showing a two-dimensional distribution of intensity at a specific wavelength can be created.

As described above, the present invention can be applied to any system or device that can obtain a spectrum showing a change in intensity with variations in parameters, such as a mass-to-charge ratio, a wavelength, the number of waves, and energy at each of many measurement points on a sample. In which case, it is possible to perform highly reliable difference analysis and comparative analysis.

The foregoing embodiments and other modifications are merely examples of the present invention. Even if modifications, corrections, additions, for example, are made as appropriate within the spirit of the present invention, they are obviously included in the claims of the present application.

REFERENCE SIGNS LIST

1 . . . Imaging Mass Spectrometric Unit
2 . . . Microscopic Observation Unit
3 . . . Data Analysis Unit
30 . . . Data Storage Unit
31 . . . ROI Input Reception Unit
32 . . . m/z Candidate Search Unit
33 . . . Intensity Histogram Creation Processing Unit
34 . . . Intensity Range Determination Unit
35 . . . ROI Correction Unit
36 . . . Test Processing Unit
37 . . . Display Processing Unit
4 . . . Input Unit
5 . . . Display Unit

The invention claimed is:

1. An imaging data analyzer that creates an image showing a two-dimensional distribution or a three-dimensional distribution of a signal intensity at a predetermined parameter value or in a predetermined parameter value range, based on spectral data obtained through a predetermined analysis subjected to a plurality of micro areas defined in a two-dimensional measurement area on a sample or in a three-dimensional measurement area in the sample, the spectral data showing a relationship between a predetermined parameter and a signal intensity, the imaging data analyzer comprising:

a region-of-interest setting unit configured to set one or more local regions of interest within the two-dimensional or three-dimensional measurement area;

a region-of-interest corresponding data selecting unit configured to obtain signal intensities at the predetermined parameter value or in the predetermined parameter value range, from spectral data obtained in a plurality of micro areas included in the regions of interest set by the region-of-interest setting unit, the signal intensities corresponding to the plurality of micro areas in the regions of interest;

an intensity range determination unit configured to determine a range of a signal intensity to be analyzed, based on frequency distributions of the plurality of signal intensities obtained by the region-of-interest corresponding data selecting unit; and a region-of-interest determination unit configured to determine a substantial region of interest in each of the regions of interest set by the region-of-interest setting unit by collecting micro areas whose signal intensity is within the signal intensity range determined by the intensity range determination unit.

2. An imaging data analyzer that creates an image showing a two-dimensional distribution or a three-dimensional distribution of a signal intensity at a predetermined parameter value or in a predetermined parameter value range, based on spectral data obtained through a predetermined analysis subjected to a plurality of micro areas defined in a two-dimensional measurement area on a sample or in a three-dimensional measurement area in the sample, the spectral data showing a relationship between a predetermined parameter and a signal intensity, the imaging data analyzer comprising:

a region-of-interest setting unit configured to set one or more local regions of interest within the two-dimensional or three-dimensional measurement area;

a region-of-interest corresponding data selecting unit configured to obtain signal intensities at the predetermined parameter value or in the predetermined parameter value range, from spectral data obtained in a plurality of micro areas included in the regions of interest set by the region-of-interest setting unit, the signal intensities corresponding to the plurality of micro areas in the regions of interest;

an intensity range determination unit configured to determine a range of a signal intensity to be analyzed, based on frequency distributions of the plurality of signal intensities obtained by the region-of-interest corresponding data selecting unit; and an analysis execution unit configured to perform a predetermined analysis by using a signal intensity acquired from the plurality of signal intensities obtained by the region-of-interest corresponding data selecting unit, the acquired signal intensity being within the signal intensity range determined by the intensity range determination unit.

3. The imaging data analyzer according to claim 1, wherein the region-of-interest setting unit includes:

an image display processing unit configured to display, in a display unit, an observation image or an image of the two-dimensional or three-dimensional measurement area; and a region-of-interest range designation unit configured to allow a user to designate a range of a region of interest in the observation image or the image displayed in the display unit, and the region of interest is set to the range designated through the region-of-interest range designation unit.

4. The imaging data analyzer according to claim 1, wherein the intensity range determination unit includes:

a frequency distribution display processing unit configured to display, in a display unit, a graph showing frequency distributions of the plurality of signal intensities obtained by the region-of-interest corresponding data selecting unit; and an intensity range designation unit configured to allow a user to designate the intensity range in a frequency distribution graph displayed in the display unit, and a range of a signal intensity to be analyzed is determined to be the intensity range designated through the intensity range designation unit.

5. The imaging data analyzer according to claim 2, wherein the region-of-interest setting unit sets the one or more regions of interest included in a plurality of groups targeted for difference analysis or comparative analysis, and the analysis execution unit subjects difference analysis or comparative analysis to the plurality of groups, based on a signal intensity obtained as a result of a process that the region-of-interest corresponding data selecting unit and the intensity range determination unit perform on the plurality of groups.

6. The imaging data analyzer according to claim 5, wherein each of the difference analysis or the comparative analysis is analysis using a statistical hypothesis test.

7. The imaging data analyzer according to claim 3, wherein when a signal intensity or signal intensity range is designated in a frequency distribution graph displayed in the display unit, the image display processing unit displays a micro area corresponding to the signal intensity or the signal intensity range in observation image or the image of the two-dimensional or three-dimensional measurement areas displayed in the display unit.

8. The imaging data analyzer according to claim 4, wherein when a site or range in the regions of interest is designated in the observation image or the image of the two-dimensional or three-dimensional measurement areas displayed in the display unit, the frequency distribution display processing unit displays a location of a signal intensity in the frequency distribution graph, the signal intensity being obtained in a micro area corresponding to the site or range.

9. The imaging data analyzer according to claim 1, wherein the predetermined analysis is mass spectrometry, and the predetermined parameter is a mass-to-charge ratio.

10. The imaging data analyzer according to claim 2, wherein the predetermined analysis is mass spectrometry, and
the predetermined parameter is a mass-to-charge ratio.

* * * * *